Dec. 29, 1970  R. E. HARDING ET AL  3,550,172
Filed Jan. 3, 1968

*Inventors*
Richard E. Harding
Ralph A. Morrison
Raymond L. Peterson
Edwin P. Smalley
   By their Attorney Dec. 29, 1970  R. E. HARDING ET AL  3,550,172
FASTENER MANUFACTURE
Filed Jan. 3, 1968  5 Sheets-Sheet 4

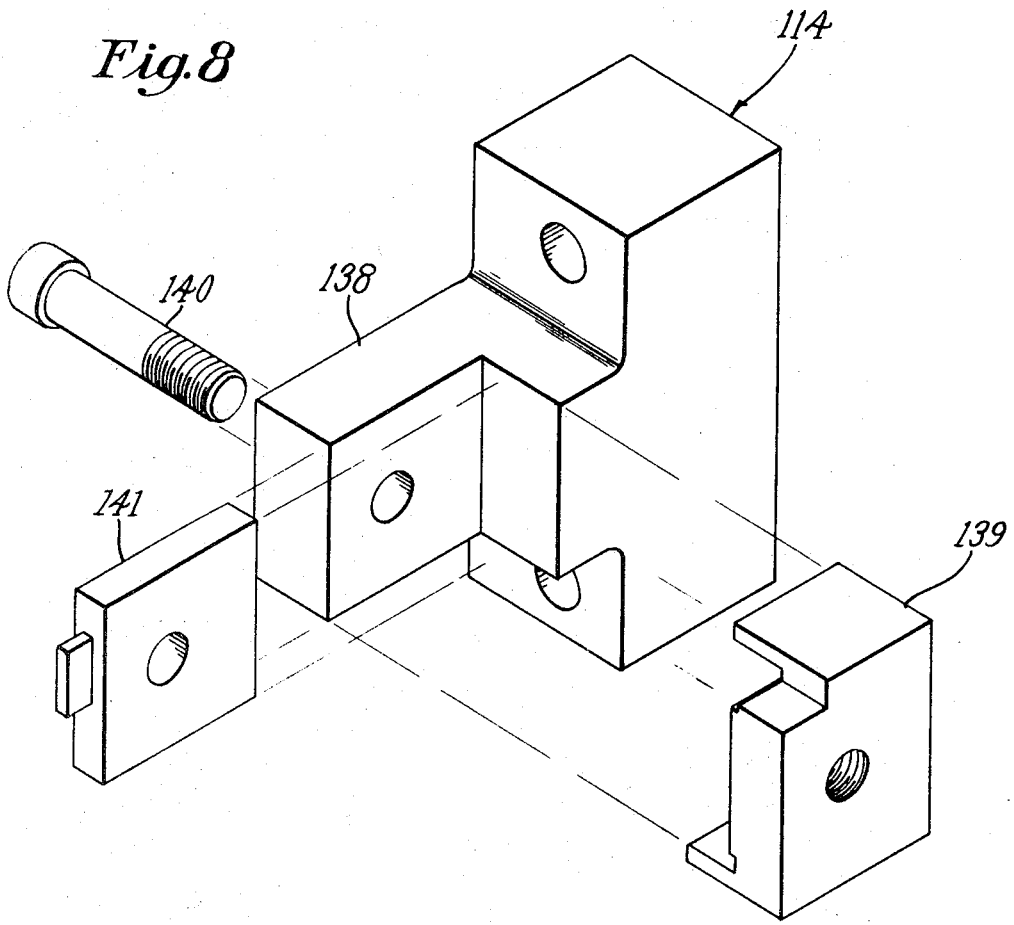
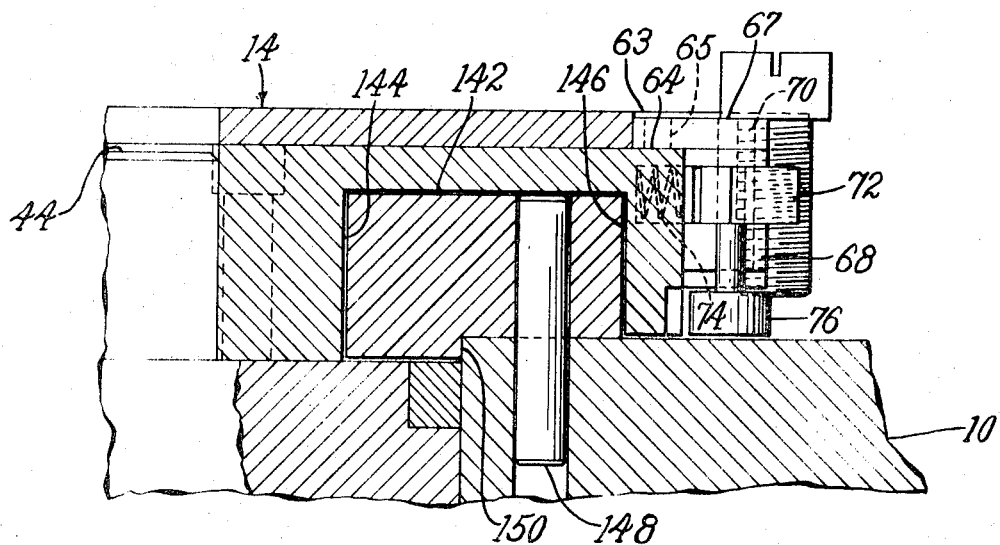

United States Patent Office 3,550,172
Patented Dec. 29, 1970

3,550,172
FASTENER MANUFACTURE
Richard E. Harding, Laconia, N.H., Ralph A. Morrison, Topsfield, Raymond L. Peterson, Beverly Farms, and Edwin P. Smalley, Wenham, Mass., assignors to USM Corporation, Flemington, N.J., a corporation of New Jersey
Filed Jan. 3, 1968, Ser. No. 695,472
Int. Cl. B23g 9/00
U.S. Cl. 10—2                                                    8 Claims

ABSTRACT OF THE DISCLOSURE

A machine for the manufacture of self-locking fasteners which comprises an indexing dial mounted for rotary movement with respect to a plurality of tool bearing work heads movable toward and away from the dial. Timed movement of the work heads is adjustable with respect to the indexing of the dial, and the length of travel of the tools is adjustable during operation of the machine. At least one of the work heads imparts a substantial force to the dial member while performing an operation on the work piece, and structure is provided for distributing the force back into the table structure.

BACKGROUND OF THE INVENTION

The present invention relates broadly to automatic machinery for performing a plurality of operations on a work piece and more particularly to apparatus for making self-locking fasteners wherein a strip or pellet of friction material is introduced into a coined or punched opening in the fastener.

In recent years, a type of threaded fastener having strips or pellets of friction material to provide a self-locking feature, has met with great success in the marketplace. These fasteners are generally manufactured by employing an arrangement of such devices as punch presses, drills and other machinery adaptable to form an opening in the fastener threaded portion for insertion of such materials as rubber, nylon and the like, for locking purposes.

Various machines have been suggested which provide for the mass production of these fasteners in a great enough quantity to satisfy the demand, which machinery has met with varying degrees of success. Such devices have been disclosed in United States Letters Patent No. 3,185,468 to Brightman, granted May 25, 1965 and United States Letters Patent No. 3,324,919 to Brightman et al., granted June 13, 1967 and assigned to the assignee of the present invention. In these patents, the fastener or work piece to be operated on is attached to a dial member which is rotated through a plurality of work stations which perform the operations of drilling, insertion of friction material, loading, ejecting etc.

While these, and other devices, have proved adequate thus far in the reliable manufacture of self-locking fasteners, a need has arisen for a machine which is effective to produce fasteners more rapidly, with more precision, and with greater simplicity than those machines available. In particular, the need is evident where the fastener is coined or punched to produce an opening for receiving friction material, particularly when both extremely large and extremely small fasteners are to be handled.

Generally in the past, when a coining operation is to be performed on a plurality of fasteners, a single press has been employed to punch all of the fasteners with a single stroke. While such machines have proved effective on a great variety of fasteners, the depth of coining becomes quite critical in the manufacture of small fasteners, which depth is found to be difficult to control in a machine of this type. It has further been found that the punching of a plurality of fasteners by a single stroke of a punch press, produces a depth of opening in the fasteners which is dependent on the resistance to the punch press by the cumulative effect of the total number of fasteners, or the high resistance of a single fastener in the group. Thus, when the press is operating on a single fastener the depth, or size opening may differ extremely from the opening produced when a group of say 10 or 20 fasteners are being operated on. Likewise, should a single fastener having material of greater hardness or resistance be introduced in a group of fasteners operated on, the effect on all of the fasteners will be changed from that of a prior group. The above mentioned are features which are often objectionable, yet inherent in machines having a single stroke operating on a plurality of fasteners, such as employed in prior art devices.

The present invention therefore has as an object to provide apparatus for making self-locking fasteners or the like wherein each fastener is individually coined by an operation separate from that of another fastener.

A further object of the present invention is to provide apparatus for making self-locking fasteners or the like having a coining operation performed wherein the depth of coining is easily adjusted during operation of the machine.

Another object of the invention is to provide machinery for making self-locking fasteners by which a plurality of operations is performed, each of which is controllable and easily adjustable independently of another operation.

Still another object of the present invention is to provide machinery for making self-locking fasteners by a plurality of operations, including a coining operation wherein the loads produced during the coining operation are distributed throughout the machinery in a manner to prevent undue deflection or stress on the critical machine components.

SUMMARY OF THE INVENTION

To achieve the objects of the present invention as set forth, an automatic machine is provided having a table with a rotatable dial mounted thereon for receiving a plurality of work pieces, such as threaded fasteners or the like. A plurality of work heads are located on the table surface in spaced relation with the periphery of the dial, each of the work heads having a tool driving means movable toward and away from the dial member.

The work heads are generally located such that the tool driving means of each head is connected to a single driving member, such as a ring gear which is driven by a suitable power source. Each of the work heads is removable from the table and re-insertable so that driving means may be moved to a position wherein timed movement relative to each of the remaining work heads, and the dial, is easily changed on remounting of the work head in the table.

Each of the work heads is provided with an adjusting means which is operative to change the extent of travel of the tool driving means in the direction of the dial periphery. The adjusting means is readily accessible and easily adjustable, during operation of the respective work head.

Additionally, a bearing block member is axially located with respect to the dial axis of rotation, and is disposed between an inner surface of the dial member and that portion of the dial adjacent the shaft on which the dial is rotated. The spacing of the bearing member relative to the dial and the shaft is such that a force transmitted from the work head to the dial, on deflection of the dial, is resisted by the bearing member. Deflection of the shaft is thereby limited, as a predetermined deflection of the dial member is effective to load the bearing member which transmits the load into the table.

BRIEF DESCRIPTION OF THE DRAWINGS

FIG. 8 is a perspective view showing the tool holder of the apparatus shown in FIG. 1, in the disassembled condition and on a greatly enlarged scale; and FIG. 9 is a sectional elevational view taken along the lines IX—IX of FIG. 5 showing details of the dial and table structure taken on an enlarged scale.

DESCRIPTION OF THE PREFERRED EMBODIMENT

Figure 1:
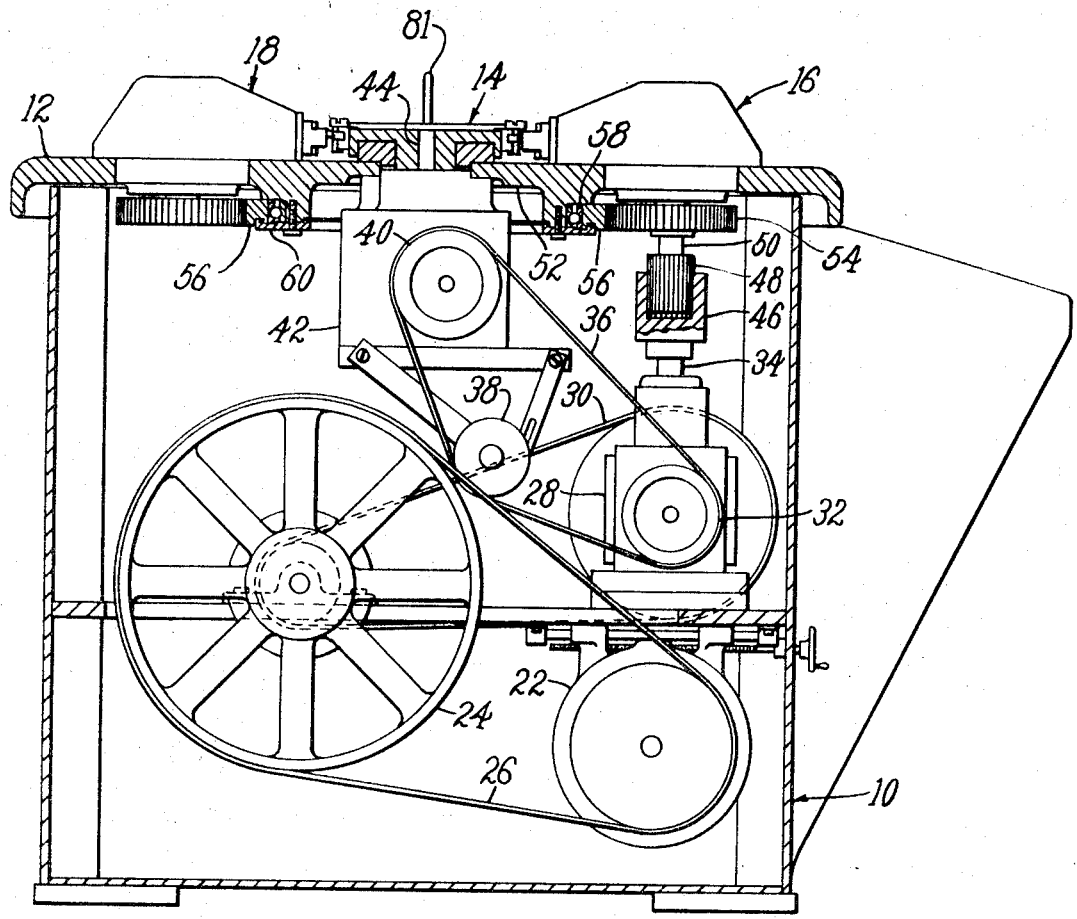
FIG. 1 is a perspective view, partially in section, showing illustrative apparatus for making self-locking fasteners, which apparatus is constructed in accordance with the teachings of the present invention.
Figure 2:
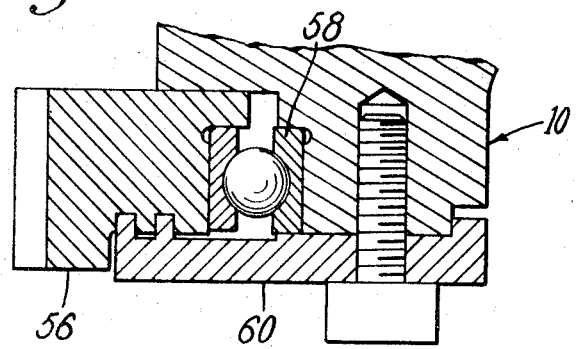
FIG. 2 is an elevational sectional view taken on an enlarged scale for clarity, and showing details of a portion of the table structure of FIG. 1.
Figure 3:
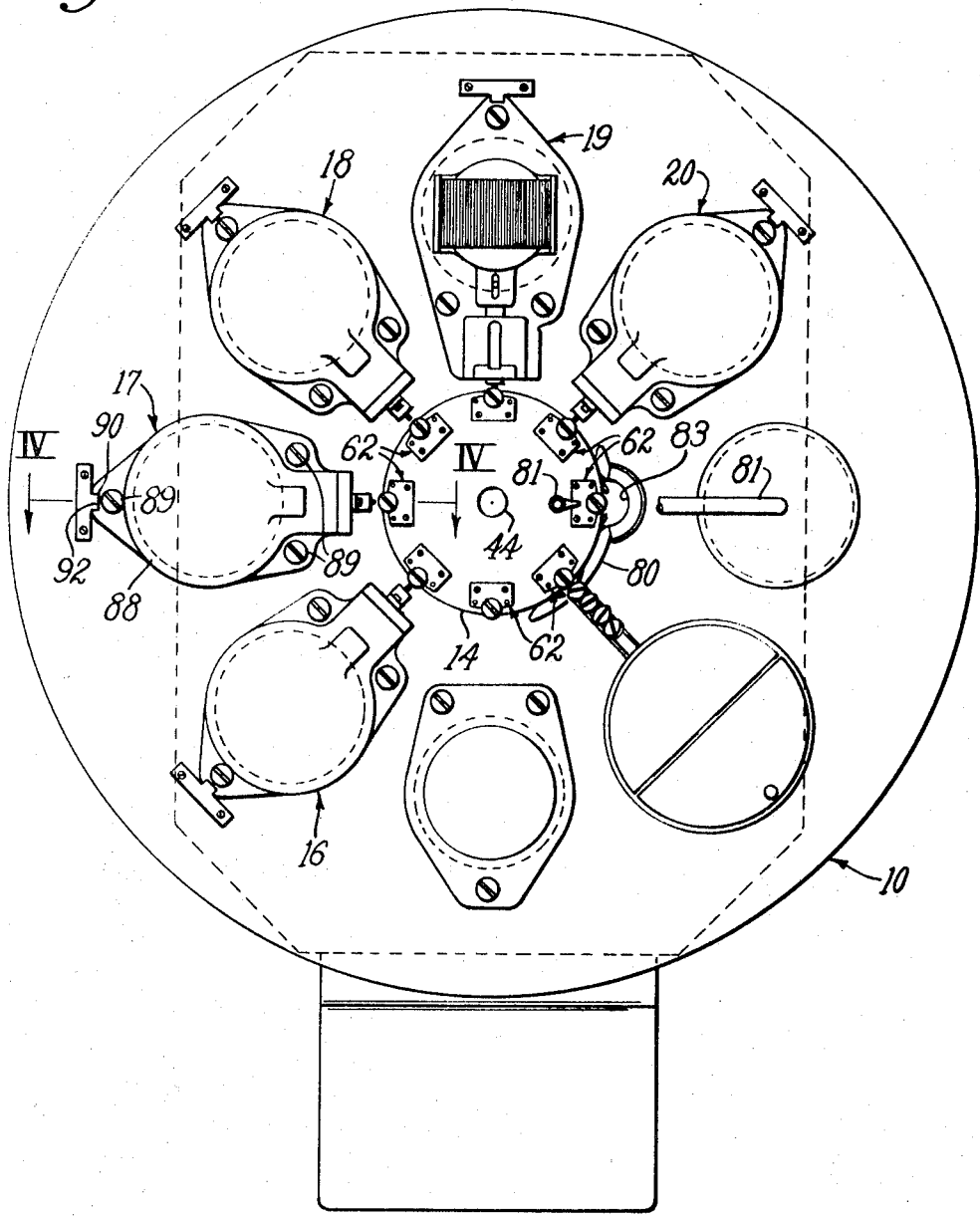
FIG. 3 is a top plan view of the structure shown in FIG. 1 showing further details of the work heads and related elements.

Referring now to the drawings, and in particular FIGS. 1 through 3, there is shown a machine for manufacturing self-locking fasteners constructed in accordance with the teachings of the present invention which includes a framework or table 10 having a top surface 12 with a plurality of openings formed therein. A dial member 14 is mounted in an opening centrally located with respect to a plurality of openings having work heads 16, 17, 18, 19 and 20 (FIG. 2) mounted therein. Each of the work heads 16, 17, 18, 19 and 20 has a portion extending below the surface 12 through its respective opening in the table 10, which portion is interconnected with a drive means, to be described later in detail.

The work head 16 is effective to produce a first coining operation on the work while the head 17 is also provided with a coining tool for insuring proper depth of penetration in the work piece. The work head 18 is provided with a tool for re-forming threads on the work piece, the head 19 with a ram for inserting friction material into the coined opening, and the head 20 with a tool for re-forming threads on the work piece, including the inserted material.

The machine is provided with a drive train which includes an electric motor 22 connected to a flywheel 24 by a drive belt 26. The flywheel 24 is in turn connected to a right angle drive gear box 28 by a belt 30. Movement of the belt 30 causes rotation of a pulley 32, and rotation of the shaft 34 which may be in direct drive with the belt 30 or may be geared to a different rotational speed by virtue of the gears in the gear box 28.

The pulley 32 serves to drive a belt 36 which runs over an idler pulley 38, and a pulley 40 operatively connected to an indexing mechanism 42. The indexing mechanism 42 will not be described in detail here, as the particular construction of the device is not an essential part of the present invention, and commercially available units are known in the art which may be adapted for use in the present machine. Let it merely be stated, at this point, that the indexing mechanism 42 may be any device which through constant rotation of the pulley 40 will cause step-by-step rotation of the dial member 14. To achieve this, the mechanism 42 is provided with a shaft 44 extending through an opening in the dial 14 which shaft is keyed to the dial member to impart the step-by-step rotation thereto.

Referring particularly to FIG. 1, the shaft 34 has provided thereon a sleeve 46, which sleeve has internal gear teeth in meshing engagement with gear member 48 provided on a shaft 50. The shaft 50 is operatively connected to the work head 16 and has disposed adjacent a table surface 52 opposite from the dial member surface 12, a planet gear 54.

Referring to FIGS. 1 and 2, it will now be observed that a ring gear 56 is disposed with its axis of rotation coinciding with that of the dial member 14 adjacent to the under surface 52 of the table, and serves as a drive gear for the work heads 17, 18, 19 and 20. The ring gear 56 rides on a bearing assembly 58 which assembly is held in place by a retainer plate 60 fastened to the table 10. The ring gear 56 is located with its teeth in meshing engagement with the gear 54 and is thus rotated by rotation of the shaft 50.

Each of the other work heads 17, 18 19 and 20, i.e. exclusive of 16, is provided with a planet gear similar in construction to the gear 54, the planet gears each having teeth meshed with the ring gear 56 such that rotation of the ring gear serves to operate each of the work heads through rotation of the individual planet gears.

While the shaft 50 has been shown interconnected with the work head 16 it should be evident that the shaft could have as well been connected to any one of the other work heads 17, 18, 19 or 20, the only requirement being that any one planet gear be directly turned by the shaft 50, each of the remaining planet gears being turned through their interconnection with the ring gear 56.

Figure 4:
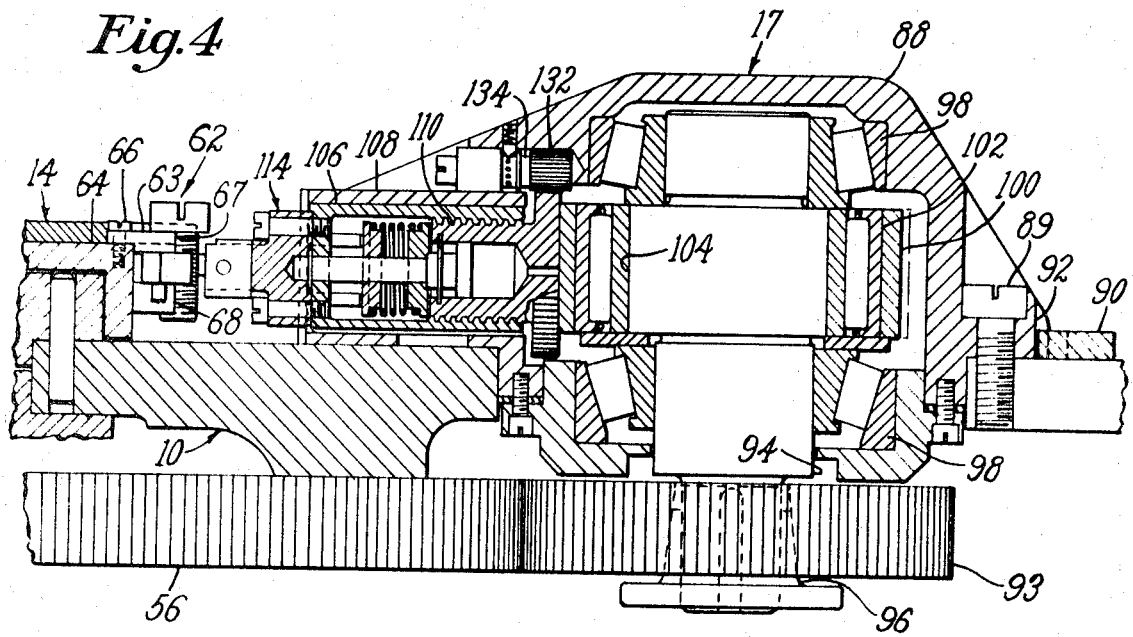
FIG. 4 is an elevational sectional view taken along the lines IV—IV of FIG. 3 showing details of a typical work head taken on an enlarged scale for clarity.

Referring now to FIGS. 3, 4 and 9 the reader will observe that the dial member 14 is provided with work holding means in the form of a plurality of work holders 62 which are designed to retain a work piece on the periphery of the dial during operation of the machine. Each of the work holders 62 has a flange 63 disposed adjacent to a recess surface 64 of the dial member 14 which flange has attached thereto a dowel pin 65 received in the recessed portion of the dial member. The dowel 65 serves to precisely locate the work holder 62, and a pair of screws or other suitable fasteners 66 serve to retain the flange 63 against the surface 64 of the dial. It should here be noted that the work holders 62 are readily interchangeable with other suitable work holders which may be provided for receiving various fastener sizes, as desired.

Figure 5:
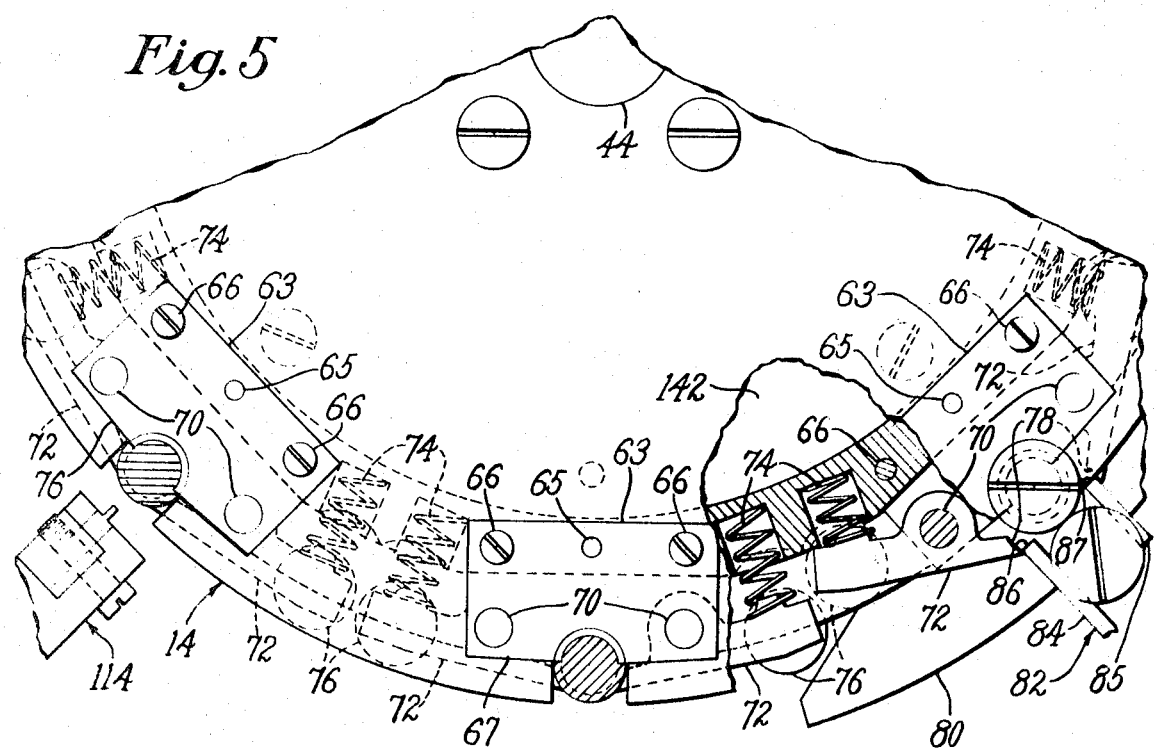
FIG. 5 is a fragmentary top plan view, partially in section, showing a portion of the structure of FIG. 3 taken on an enlarged scale.

Referring to FIGS. 4 and 5 taken in connection with FIG. 9, the work holder 62 is seen to further comprise a upper outwardly extending flange 67 and a lower outwardly extending flange 68 which receive a pair of pins 70 therebetween. Near either side of the work holder 62 and between the upper flange 67 and the lower flange 68, and arm 72 is pivotally supported by the pin 70, the arm having one end in registry with a helical spring 74 received in an opening in the dial member 14. At the same end of the arm 72 there is provided a roller 76, which will be seen to function as a cam follower during operation of the machine. The opposite end of the arm 72 is provided with a concave threaded portion 78 which serves to clamp a threaded fastener against the work holder 62 when the arm 72 is biased outwardly by the spring 74. Each of the flanges 67 and 68 have threads provided in the outer portion for receiving the threaded fastener, and thereby are effective to locate the fastener vertically within one thread tolerance when the fastener head is resting upon the upper surface of the flange 67, as shown in FIGS. 4, 5 and 7.

As the dial member 14 is rotated, the threaded fasteners are retained throughout the greater arc of dial rotation. However, as will be noted in FIG. 3, after a fastener has passed the work head 20, a cam member 80 is located such that the rollers are forced inwardly against the springs 74 to thereby rotate the arms 72, and release a fastener held by the concave surfaces 78 of the arms at which point a blast of air from a nozzle 81 forces the fastener into a suitable receptacle below the opening 83. By changing the location of the cam 80 or shape of the cam surface, the arms 72 may be made to open or close as desired at a given location, and at a given rate.

Figure 7:
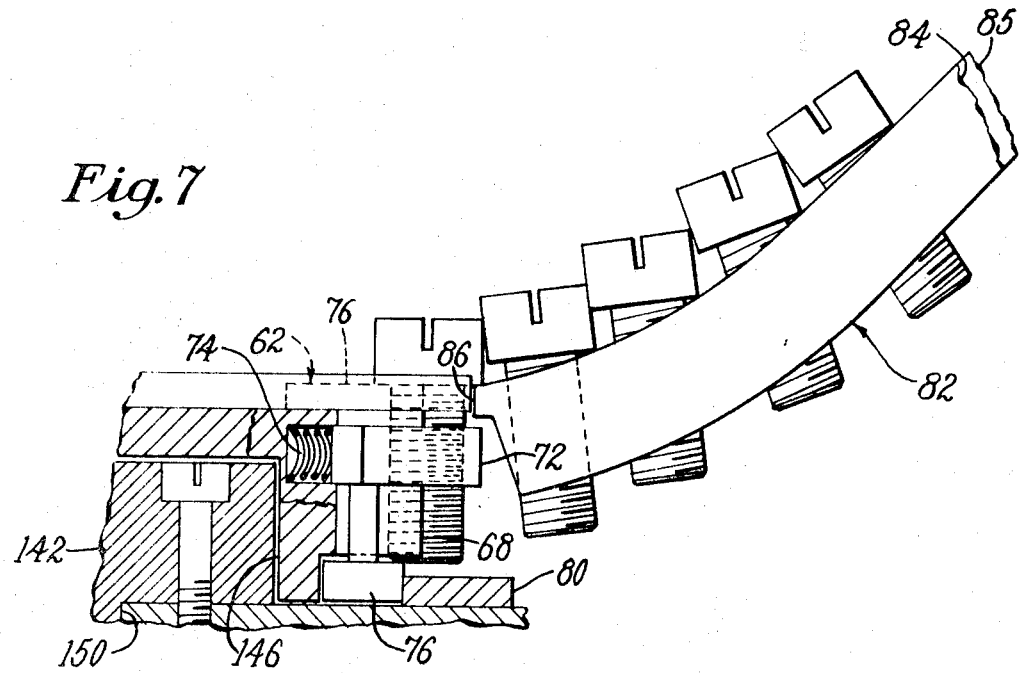
FIG. 7 is an elevational sectional view taken along the lines VII—VII of FIG. 5 showing the feed mechanism employed in the apparatus of FIG. 1, taken on an enlarged scale.

Referring now to FIGS. 5 and 7 the cam 80 is shown effective to retain the arm 72 in an open position adjacent both the feeding and ejection stations. The feeding station, as best shown in FIG. 7, is provided with a ramp 82 which comprises a pair of plates 84 and 85 held in spaced relation for receiving fasteners therebetween. The fasteners are fed to the ramp 82 by a vibratory bowl, manually, or by any known means as desired. Each of the plates 84 and 85 has a lip 86 and 87 respectively which is closely spaced with respect to the periphery of the dial member 14. The fasteners are forced down the ramp 82 by the effect of gravity and are caused to slide onto the flange 67 after which they are clamped in place by the arms 72 which are released by the cam 80.

Figure 6:
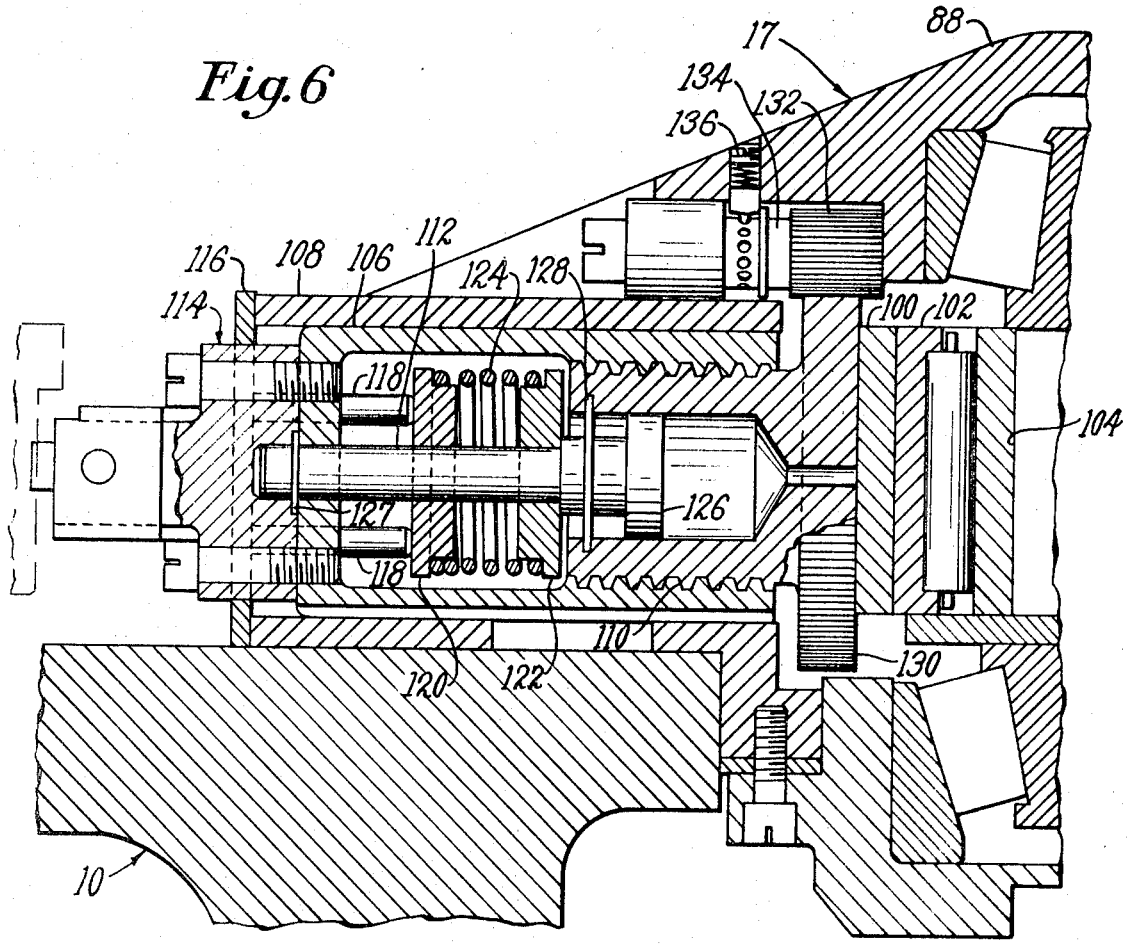
FIG. 6 is a fragmentary sectional view showing a portion of the structure of FIG. 4 taken on a greatly enlarged scale to better show details of the work head elements.

For the description of a typical work head reference should be had to FIGS. 3, 4 and 6. The work head 17, to be described, has a housing 88 and is shown to be mounted to the table 10 by threaded fasteners 89 extending through openings in the housing. A retaining key 90 is also fastened to the top of the table 10 and has a portion extending into, and in close fitting engagement with a slot 92 provided in the housing 88, which key serves to retain the radial location of the work head 17 relative to the dial member 14.

As previously alluded to, and best shown in FIGS. 4 and 6, the work head 17 is provided with a tool driving means which includes a planet gear 93 retained on a shaft 94 by a tapered locking member 96. The shaft 94 is rotatably supported in the housing 88 by virtue of a pair of roller bearing assemblies 98, and has a ring 100 mounted on a roller bearing assembly 102 received on an eccentric portion 104 of the shaft. It will be evident from the structure thus far described that rotation of the shaft 94 produced by the gear 93 is effective to cause the outer surface of the ring 100 to move toward and away from the dial member 14, due to the eccentricity of the portion 104.

Referring now to FIG. 6, the reader will note that the tool driving means further includes a cylindrical member 106 received for sliding movement in a sleeve portion 108 of the housing 88. The cylindrical member 106 is provided with internal threads at one end thereof for receiving the anvil member 110. The anvil member 110 is partially hollow and has a retainer rod 112 received in the hollow portion.

A tool holder assembly 114 is fastened to the opposite end of the cylindrical member 106, and extends through an opening in a cover plate 116 provided at one end of the sleeve portion 108. The cover plate 116 is fixed to the sleeve portion 108 by welding or any other suitable means and is provided with a plurality of guide pins 118 which extend through openings in the cylindrical member 106. A pair of spring retaining plates 120 and 122 are slidably mounted on the retainer rod 112 and have a helical spring 124 mounted therebetween. The plate 120 bears against the guide pins 118, and the plate 122 bears against a stepped portion 125 of the rod 112 thereby biasing the entire assembly, including the cylindrical member 106 away from the cover plate 116. It will be noted that the retainer rod 112 is provided with a snap ring 127 at one end thereof for locking the rod relative to the member 106, and a head portion 126 at the other. The head portion 126 is slidable in the anvil 110, however, it is retained in the hollow portion of the anvil by a second snap ring 128.

In the structural orientation shown in FIG. 6 the tool holder assembly 114 is in the operative position, that is, it is in the extended position, caused by operation of the work head 17. The ring 100 has been rotated radially outwardly with respect to the shaft 94 to its outer limit, thereby contacting and imparting a force to the anvil 110 to move the cylindrical member 106 and tool holder assembly 114 outwardly, compressing the spring 124. On rotation of the shaft 94 the eccentricity of the shaft portion 104 will cause the ring 100 to move inwardly toward the shaft and the spring 124 will serve to move the cylindrical member 106 and the anvil 110 inwardly toward the shaft, the anvil riding on the ring 100. This will effect movement of the tool 114 away from the work piece, as the cylindrical member moves in the sleeve portion 108.

Referring still to FIG. 6 the reader will observe that the anvil 110 is provided with a gear portion 130 having teeth which mesh with a mating gear 132 disposed at one end of an adjustment screw 134. The adjustment screw 134 is mounted for rotation in the housing 88, and a setscrew 136 is provided for locking the adjustment screw against inadvertent rotation caused by vibration. The teeth of gear 132 are of a width greater than those of the gear portion 130 to provide for movement of the gear portion 130 axially while the teeth are in meshing engagement. To adjust the throw of the tool holder 114, the adjusting screw 134 is rotated to turn the anvil gear portion 130. The cylindrical member 106 is prevented from rotary motion by virtue of the guide pins 118, which results in relative movement between the anvil 110 and the cylindrical member at their mating screw threads when the gear portion 130 is rotated. This serves to have the effect of elongating, or foreshortening the assembly comprising the anvill 110 and the cylindrical member 106 to thereby increase or decrease the throw of the tool holder assembly 114.

It will thus be apparent that the retainer rod 112 acts first as a safety element in that the anvil 110 and cylindrical member 106 can only be elongated until the head portion 126 abuts the second snap ring 128. This limit is set such that the assembly cannot be lengthened to the extent where the cylindrical portion 106 will strike the cover plate 116 when the assembly is in the operative position, as shown.

In the structure of the tool drive means as described above, it will be observed that the spring 124 applies a force to the member 106 through the rod 112 when retracting the tool from the work piece which force is in the same direction as that produced on the member 106 when the tool is thrust against the work piece. By applying this retracting force through the rod 112 and member 106, rather than directly to the anvil member 110, the threaded connection between the members 106 and 110 is always in compression and thereby stressed in the same manner, thus eliminating a cycling effect on the threads and minimizing the probability of fatigue failure.

Referring now to FIG. 8 the tool holder assembly 114 is seen to comprise a body member 138 having a tool cap 139 which is held in place by a threaded fastener 140. A coining tool 141 is shown in alinement to be placed between the tool cap 139 and the body member 138 which serve to receive the tool and retain it in close fitting engagement. The fastener 140 is received through an opening in the body 138 and threadedly engaged in the cap 139 to rigidly hold the asssembly in place. It will be obvious that a variety of tools such as for thread forming, inserting of friction material, as well as for the performance of other operations may be exchanged for the coining tool 141. In addition, coining tools of various sizes and having differing material characteristics are easily substituted for the tool shown, each adapted to be received in the tool holder assembly 114.

Each of the other work heads 16, 18, 19 and 20 is constructed in accordance with the above description, only the tools being different to perform the various functions, as required. The work heads are readily interchangeable by removal of the fasteners 89 which allows the entire work head assembly to be lifted upwardly through the opening in the table 10. The providing of a readily removable work head, with the planet gear and ring gear arrangement also facilitates precise timing of the various operations independently with respect to the indexing dial 14, as the planet gear of each head may be moved relative to the ring gear 56 prior to remounting in the table 10.

In the instance of the work head 16 which is directly driven by the shaft 34, the work head is readily removable from the table 10 by virtue of the sleeve 46 having integral teeth meshing with the gear member 48. The head 16 is removed as easily as those heads not directly driven, the gear member 48 being removed, and reinserted in the sleeve 46 when the planet gear 54 is in the desired mating engagement with the ring gear 56.

In operation, as has been described in part in the preceding paragraphs, the various work heads are arranged in position with their planet gears in engagement with the ring gear 56 such that the tool of each work head is movable toward and away from the dial 14 in a desired sequence as the dial is indexed step-by-step. However, it has been found that the balancing of forces about the dial 14 is relatively difficult to achieve in that the coining, threading, and inserting steps do not produce the same loading on the dial periphery, even when adjusted to apply the loads simultaneously on the dial member.

The undesirable imbalance of loads on the dial member 14 is overcome in the present structure by providing an annular bearing block 142, as is best shown in FIG. 9. The dial member 14 is fabricated such that a recessed portion is formed to define the walls 144 and 146. The bearing block 142 is disposed in spaced relation with the surfaces 144 and 146 such that deflection of the outer rim of the dial member 14 will cause the surface 146 to contact the bearing block 142. Likewise, should the load be of sufficient magnitude to produce additional deflecttion after being distributed between the upper portion of the dial member and the bearing block 142, any load reaching the shaft 44 will serve to deflect the shaft only until the surface 144 of the dial member 14 opposite the load contacts the surface of the bearing block 142.

As best shown in FIG. 9 the bearing block 142 is attached to the table 10 by a plurality of dowel pins 148 which are of a diameter to be tightly received as by a press fit in both the table 10 and the bearing block 142. Additionally, the surface 150 of the notched portion of the bearing block 142 is in lin-to-line contact with the table 10 to provide a suitable bearing surface at that point.

In actual practice it has been found that providing of a spacing of .001" between the surface 146 and the bearing block 142 to provide a running clearance of .002" between the dial 14 and the bearing block is effective to achieve satisfactory results in the disclosed machine. However, it will be evident that the allowable deflection of the shaft 44 must be considered when arriving at a suitable spacing between the surface 146 and the block 142, and in some applications the objective of providing a load absorbing member may be achieved by providing a greater spacing than the figure set forth above.

The machine as described therefore provides a simple device for manufacturing threaded self-locking fasteners or the like. As has been described, the relative timing of the various work heads 16 through 20 is easily adjustable by removing the work head from the table 10 and rotating the respective planet gear such that its timing is changed with respect to the movement of the ring gear 56.

Additionally, should it be observed that the tool assemblies 114 are not achieving the depth, or throw, desired during operation of the machine, each may be individually adjusted by means of the adjusting screw 134, without stopping operation of the machine.

Having thus described our invention, what we claim as new and desire to secure by Letters Patent of the United States is:

1. Apparatus for making self-locking fasteners or the like comprising: a table structure having a dial member mounted adjacent to a surface thereof and rotatable about an axis substantially perpendicular to said table surface, work supporting means disposed adjacent to the outer periphery of said dial member for holding a workpiece on said dial member, a plurality of work heads arranged on said table surface in spaced relation with the outer periphery of said dial member, each of said work heads having means for driving a tool toward and away from said dial member, and a single drive gear contacting each of said work head drive means for operating said tool driving means by rotation thereof wherein each of said tool driving means comprises a single shaft having its axis substantially parallel to said dial member axis and having a gear mounted thereon adjacent the opposite surface of said table from that of said dial member, said single drive gear being disposed in axial alignment with said dial member in meshing engagement with said shaft gears, each of said work heads further being readily removable from said table surface for selectively mating said shaft gear teeth with said drive gear teeth on remounting of the work head on said table.

2. The structure of claim 1 which further includes a drive motor connected to said dial member and said drive gear, said drive motor effective during operation to cause step-by-step rotation of said dial member and continuous rotation of said drive gear.

3. The structure of claim 1 wherein said drive gear member is mounted in axial alinement with said dial member and located adjacent an opposite surface of the table structure from that of said dial member and wherein said table structure has a plurality of openings provided therein for receiving said tool driving shafts therethrough for meshing engagement of said shaft gears with said drive gear.

4. The structure of claim 1 wherein said work supporting means further comprises means for retaining a threaded fastener on said dial member with the fastener axis substantially parallel to the dial axis and wherein at least one of said work heads is provided with a tool for coining a recess in the fastener which tool is disposed such that the recess is formed in the fastener by movement of said work head tool driving means.

5. The apparatus of claim 1 wherein said tool driving means shaft is provided with an eccentric surface which upon shaft rotation is movable toward and away from said dial member to impart a force to said tool and an extensible means interposed between said eccentric surface and a tool mounted on said work head for adjustment of the spacing between the tool and said surface.

6. The apparatus of claim 5 wherein each of said work heads further comprises a housing substantially fixed with respect to said dial member and having said eccentric surface of said shaft and said extensible means located therein, said extensible means comprising a pair of members in threaded engagement, and means mounted on said housing for rotating one of said members relative to the other to extend or retract said extensible means whereby the spacing between the tool and said shaft surface is adjustable during operation of said work head.

7. The apparatus of claim 6 which further includes means for biasing said extensible means toward said shaft, said biasing means and said eccentric portion of said shaft each providing a compressive force between said pair of members.

8. The apparatus of claim 7 wherein at least one of said pair of members is tubular, and wherein said biasing means is disposed in said tubular member.

References Cited

UNITED STATES PATENTS

| | | | |
|---|---|---|---|
| 596,830 | 1/1898 | Rodgers | 29—38.1 |
| 1,496,794 | 6/1924 | Van Hamersveld | 29—38.1 |
| 2,740,973 | 4/1956 | Borner et al. | 10—10 |
| 2,779,039 | 1/1957 | Borner | 10—72 |
| 2,980,928 | 4/1961 | Wallace et al. | 10—2 |
| 3,159,855 | 12/1964 | Wallace et al. | 10—2 |
| 3,185,468 | 5/1965 | Brightman | 10—2 |
| 3,310,821 | 3/1967 | Rehberg | 10—2 |
| 3,314,125 | 4/1967 | Walters | 29—38.1 |
| 3,324,919 | 6/1967 | Brightman et al. | 10—10 |

CHARLES W. LANHAM, Primary Examiner

E. M. COMBS, Assistant Examiner